United States Patent [19]

Kauppinen

[11] Patent Number: 5,267,018
[45] Date of Patent: Nov. 30, 1993

[54] STACKING METHOD AND EQUIPMENT FOR MEASURING THE TIMBER VOLUME AND OTHER DIMENSIONS OF A STACK OF LOGS

[76] Inventor: Mauno Kauppinen, Koulutie 6, SF-40900 Säynätsalo, Finland

[21] Appl. No.: 853,731
[22] PCT Filed: Nov. 23, 1990
[86] PCT No.: PCT/FI90/00283
§ 371 Date: Jul. 6, 1992
§ 102(e) Date: Jul. 6, 1992
[87] PCT Pub. No.: WO91/08438
PCT Pub. Date: Jun. 13, 1991

[30] Foreign Application Priority Data

Nov. 27, 1989 [FI] Finland .................. 895657

[51] Int. Cl.⁵ ............................ G01B 11/00
[52] U.S. Cl. ............................ 356/379; 356/385
[58] Field of Search .............. 356/379, 380, 383–385

[56] References Cited

U.S. PATENT DOCUMENTS 3,593,632 7/1971 Woodruff .................. 356/379
4,913,551 4/1990 Davis .................. 356/379

Primary Examiner—F. L. Evans
Attorney, Agent, or Firm—C. J. Fildes & Co.

[57] ABSTRACT

The object of the invention is a stack measurement method and equipment to measure especially the timber volume and other dimensions, in which method the external dimensions of the stack, and the average diameter and length of the logs are measured, from which the timber volume is calculated. The method includes the following stages: a beam of light is set transversely around the stack; the beam of light is photographed at an angle from both in front and behind, from both sides and from on top of the stack; the location of the beam is measured from the video image; the curves depicting the surface of the logs are recognized and differentiated from the image of the line; the diameter of the outer logs at the point of measurement is calculated from the curves; measurement is carried out at regular intervals over the entire length of the stack, when the lengths of the outer logs are obtained; the dimensions of the outermost logs are calculated, and with their aid the average diameter and length.

6 Claims, 3 Drawing Sheets

STACKING METHOD AND EQUIPMENT FOR MEASURING THE TIMBER VOLUME AND OTHER DIMENSIONS OF A STACK OF LOGS

The object of the invention is a stacking method and equipment, especially for the measurement of the timber volume and other dimensions of a stack of timber, in which method measurements are made of the external dimensions of the stack, and the average diameter and length of the logs, from which the timber volume is calculated. When connected to the measurement of the total weight the invention is also concerned with the measurement of the specific gravity of the stack.

In the manufacture of cellulose in particular it is advantageous to know the moisture content of the timber being used as raw material. Raw timber comes to the cellulose mill as stacks of logs, and the moisture content in these can vary considerably. When the moisture content of the raw timber being fed into the process can be measured more accurately than previously, savings are made in the chemicals used in cooking, because they can be more accurately portioned.

On the other hand, the size of the logs contained in the log stacks is of particular significance in the manufacture of mechanical pulp, in which it is not advantageous to mix logs of different size with one another. In practice the smaller logs are partly lost among the large ones. Often the variation in the diameters of the logs in a stack is not great, but different stacks vary greatly in this. By ascertaining the average diameter of the logs in a stack it is possible to roughly sort the logs into size grades.

A stack measuring method, in which the ends of the stack are filmed with a video camera and the outlines of the ends of the logs are recognized and their location is measured, is known from the international application publication WO 89/7749. The filming and measurements are carried out from both ends, in which case it is possible to measure the total volume of the logs of the stack very accurately. This kind of method is, however, so slow that it cannot be applied to the measurement of each stack of logs arriving at the mill.

A measurement method, in which the relation between the dark and light areas is measured from a video picture of the end of the stack, from which the so-called side density can be calculated, is known from the Swedish publication print 391580.

No known method of measurement makes it possible to measure the desired dimensions quickly from the stack and without separating the stack from the transportation device. By means of this invention a method and equipment is created by means of which the desired dimensions can be measured directly from the load. In particular it is wished to create a so-called drive-through measurement line, in which the measurements are made by driving the load past the measurement point. The main principle of the invention is to recognize the forms of the outer logs and those projecting from the ends of the stack, by means of which the average dimensions can be calculated. The recognition of the forms of the logs to be measured is based on the analysis of the curves appearing in the video picture, the curves arising when the stack is illuminated by a beam of light from the side.

In what follows the invention is illustrated with the aid of the accompanying figures, which show one form of application of the invention.

Figure 1:
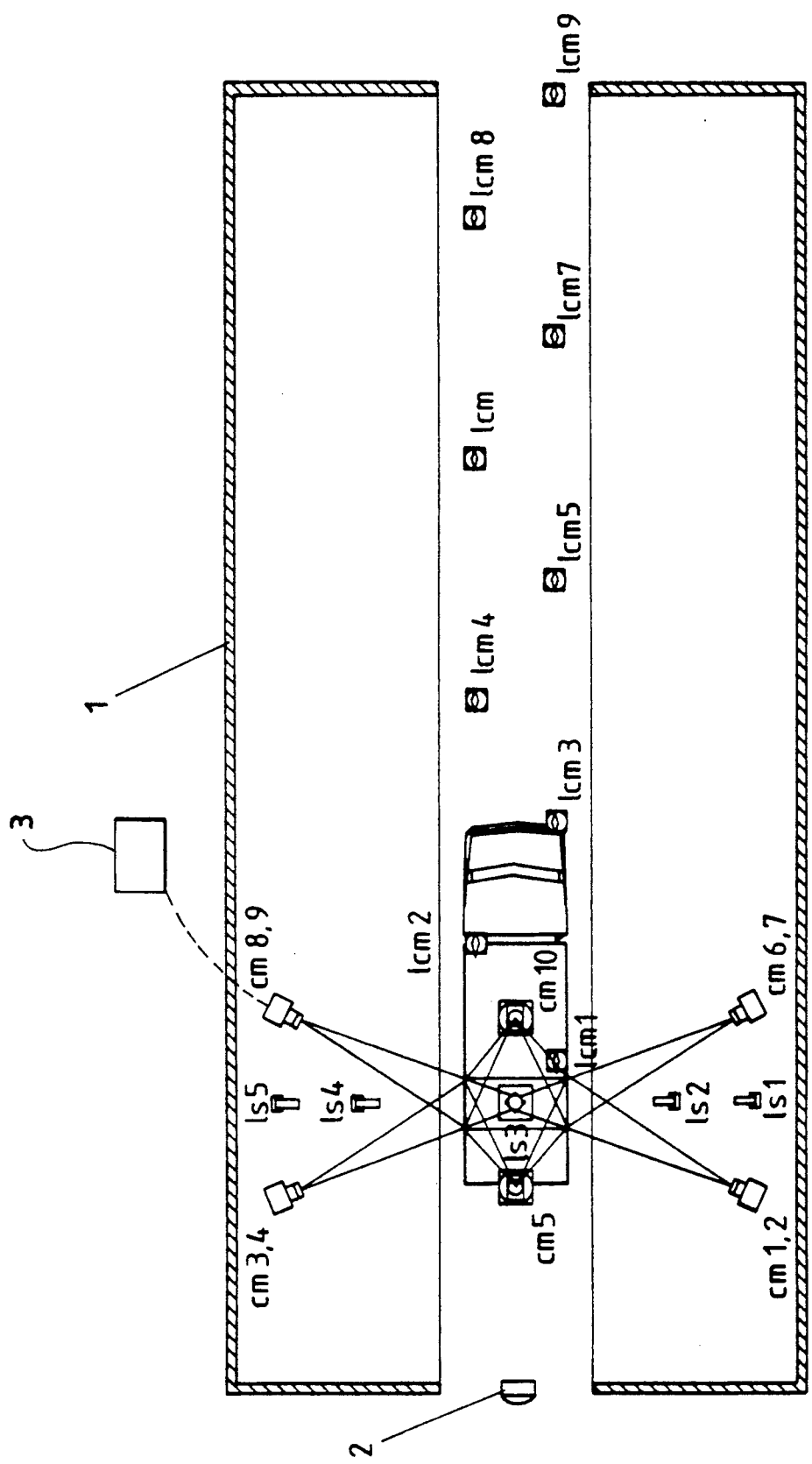
FIG. 1 shows the stack measuring equipment as seen from above.
Figure 2:
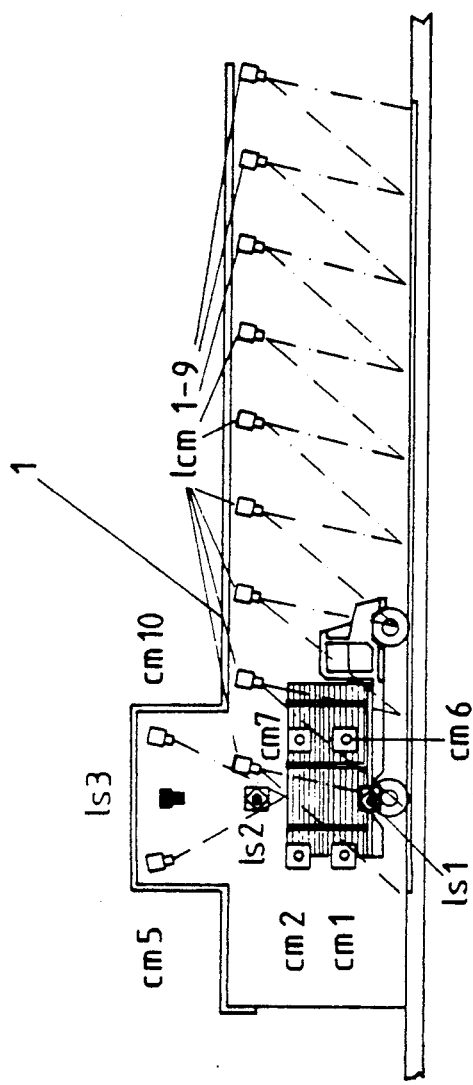
FIG. 2 shows the equipment seen from the side.
Figure 3:
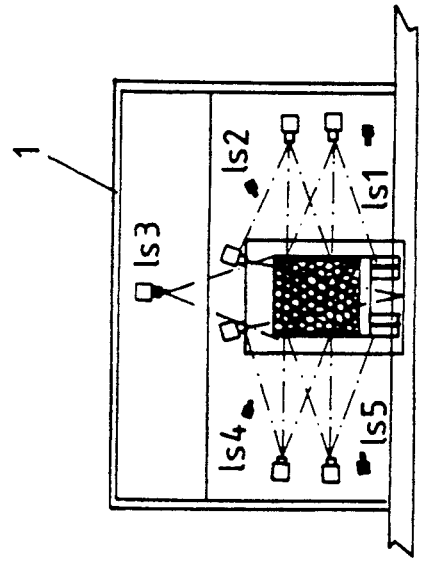
FIG. 3 shows the equipment seem from the direction of arrival of the stacks.

The equipment in accordance with FIGS. 1-3 is installed in hall 1, through which a log truck can drive. Hall 1 is so long that a log truck with a full trailer can fit entirely inside it. When the measuring equipment is ready, the truck driver is shown a green light by means of traffic light 2, when he can drive the truck with its load slowly through hall 1.

The displacement of the vehicle and the stacks of logs with it is measured with the aid of line camera equipment LCM 1-9 and the calculating equipment connected to it. The point of measurement is illuminated by means of a laser light. The laser transmitters LS 1-5 provide a plane-like field, which is at right angles to the direction of travel of the stacks. They create a powerful beam of light round the material that is moving past the measurement point. It is most advantageous to use sources of laser light that operate in the semi-infrared range (wavelength 900-1100 nm), when interference caused by light in the surroundings can be eliminated.

By means of displacement measurement equipment, the cameras CM 1-10 are set to record the log truck at intervals of 5 cm. This interval between measurements is adjusted in accordance with the requirements for accuracy.

It is imperative that the cameras CM 1-10 are placed at an angle in relation to the plane of light. The beam of light round the stack then appears in the video image as a discontinuous curve, the absolute position of which can be determined from the video image. The vehicle and other structures are analyzed out by means of form recognition. On the other hand, the separate logs of the stack create very clear curves in the video image, which are quite simple to discern and differentiate from the video image.

For the area between the ends of the logs as such it is sufficient to use a camera operating at an angle either in front of or behind the beam of light, but the corners of the stack and the fixed structures of the transportation device cause obstruction to vision that demand the use of two cameras to recognize each point on the beam of light, one of which is located in front of the beam and the other behind it, in relation to the direction of travel. There is at least one pair of cameras for each measurement point on the side of the stack.

In the example case, each side is measured with two pairs of cameras and the upper part of the stack with a further pair in order to improve the accuracy of measurement. In FIGS. 1-3 the cameras are in pairs as follows: CM1-CM6, CM2-CM7, CM3-CM8, CM4-CM9, and CM5-CM10. If only single-sided depiction is used, part of the curves of the beam of light remain hidden by the corners of the stack or the fixed structure and this substantially reduces the accuracy of measurement.

Figures 4, 5:
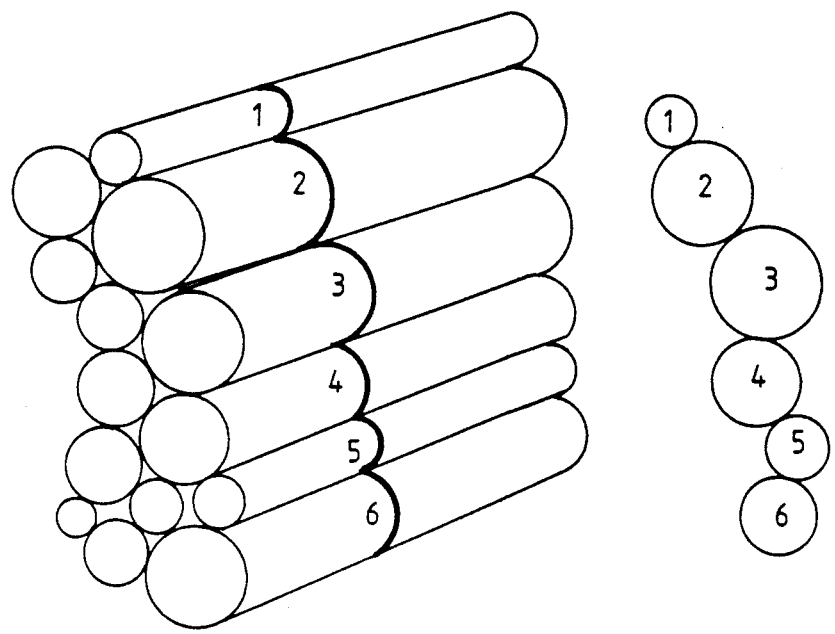
FIG. 4 shows logs located on the side of an example stack.
FIG. 5 shows a cross-section of the logs furthest to the side in a stack.
Figure 6:
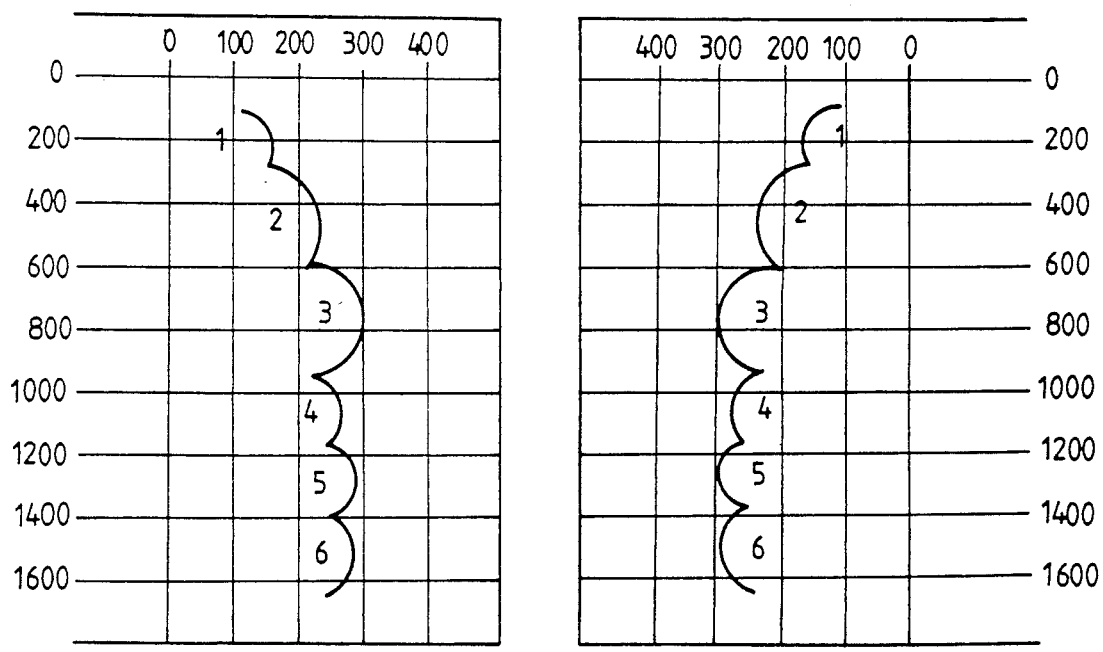
FIG. 6 shows the image information of a pair of cameras.

FIGS. 4-6 show the method of forming the image information. The outer logs of the example stack are shown in FIGS. 4 and 5. In this case six logs, which are marked with numbers 1-6, can be seen on the side of the stack. When it cuts the stack, the plane of light draws a beam of light, which appears as a discontinuous curve in the video image. FIG. 6 shows the video images in accordance with the example depicted by cameras both in front and behind. In the video images, the curves are marked with the numbers of the corresponding logs and the images are complemented with a scale, by means of which the position of each point on the beam of light forming the curve can be determined.

The camera images that are located symmetrically in relation to the beam of light are mirror images of one another in relation to the form of the beam. These collections of visual data, obtained from two different directions, help considerably in the differentiation of the fixed structure of the transportation device from the stack being measured. With the aid of the measuring equipment 3 which is connected to each camera, the outlines of cross-sections of the stack are obtained at regular intervals. These outlines form the outer layer of timber, from the separate curves of individual logs, from which it is possible to calculate both the diameter and precise location of the logs. By combining the corresponding points of the outlines of the sequential cross-sections the geometry of the stack can be determined in its entirety.

The distance travelled by the stack (displacement) is measurement continuously. Thus the distance between the sequential cross- sections is accurately determined. By adding together the intervals between the cross-sections over the length of the entire stack the length of the stack and a representative sample of the lengths of the separate logs (the outer layer and the logs extending beyond the end of stack). Because the placing of the logs in the stack is random, the sample obtained can be regarded as representative and the average diameter can be calculated from the diameter data obtained and the average length calculated from the length data. By additionally applying the vehicle load solid measurement method already in use to the most applicable part of the stack measurement method the solid volume of the quantity of timber in the stack can be calculated.

A solid measurement stack measurement method for a vehicle load is in use for pulpwood, which is based on the so-called frame volume, that is the determination of the bulk volume, from the solid volume is obtained by multiplying it by the solid volume percentage. The solid volume percentage is affected by the average diameter of the logs, the stacking class of the stack, and the knot and straightness classification of the logs. Of these, the greatest influence is that of the average diameter class, to an extent of $-3\%-+9\%$. Stacking influences by $+2\%--4\%$. Straightness and knots also have an influence of $+2\%--4\%$. These vary slightly, depending on the variety of tree. In this method the measurements are made manually in such a way, the average height, breadth, and length of the load is determined, as is the diameter class of the logs, and by visually estimating the knot, straightness, and stacking classes.

In the stack measurement method based on the cross-sectional profile determination in accordance with this invention the stacking class depicts the regularity of the profile and the straightness of the logs appears in the longitudinal profiles of the individual logs of the surface layer composed from the sequential cross-sectional profiles. The amounts in question can thus be taken into account as parameters when calculating the solid volume of a stack. The reliability of the method of measurement is based on a precise definition of the cross-sectional profile, a precise measurement of displacement, and on the fact that measurement always takes place in the same way without moving parts or visual, subjective estimation.

I claim:

1. A stacking method, especially for measuring the timber volume and other dimensions of a stack of logs, in which method the external dimensions of the stack, the average diameter and length of the logs are measured, and from these the timber volume is calculated, characterized in that, a beam of light on the stack is set transversely round the stack, the beam of light at the surface of the stack is photographed at an angle from both in front and behind, the location of the beam of light is measured from a video image, curves in the video image depicting the surface of the logs are recognized and differentiated from the image obtained, the diameters of the outer logs are calculated from the curves at the point of measurement, the measurement is carried out at regular intervals over the entire length of the stack, when the lengths of the outer logs are also obtained, the dimensions of the outer logs are calculated and used to determine the average diameter and length of the logs.

2. A method in accordance with claim 1, characterized in that, the setting and photographing of the beam of light take place from a fixed station while at the same time the stack is moved past the measurement point.

3. A method in accordance with claim 1, characterized in that, the photographing of the beam of light takes place at an angle of between 15°-60° to the plane of light.

4. A method in accordance with claim 2, characterized in that, the photographing of the beam of light takes place at an angle of between 15°-60° to the plane of light.

5. Measurement equipment for measuring the timber volume of a stack of logs comprising: at least three sources of light located round the stack, which create a transverse plane of light round the stack, at least three video cameras both in front of and behind the plane of light, which are set to photograph the light at the surface of the stack at an angle of between 15°-60° to the plane of light, measuring equipment to determine the location of the beam of light on the surface of the stack of logs to calculate the various dimensions of the logs, and devices to measure the displacement of the stack.

6. Equipment in accordance with claim 5 wherein at least some of the sources of light are laser sources of light operating in the semi-infrared area (900–1100 nm).

* * * * *